Nov. 19, 1935.  H. D. BOLTON  2,021,283
THERMOMETER
Filed Oct. 27, 1934
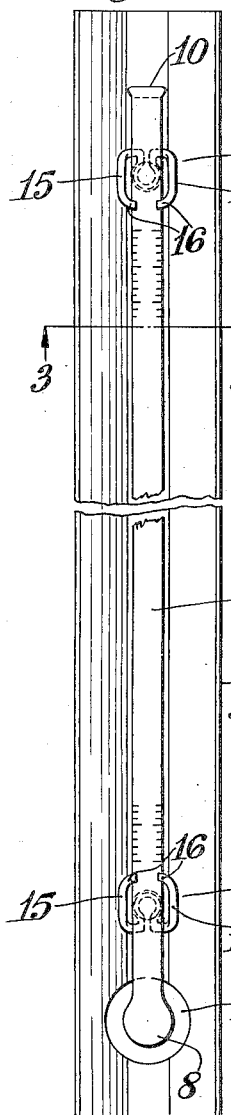
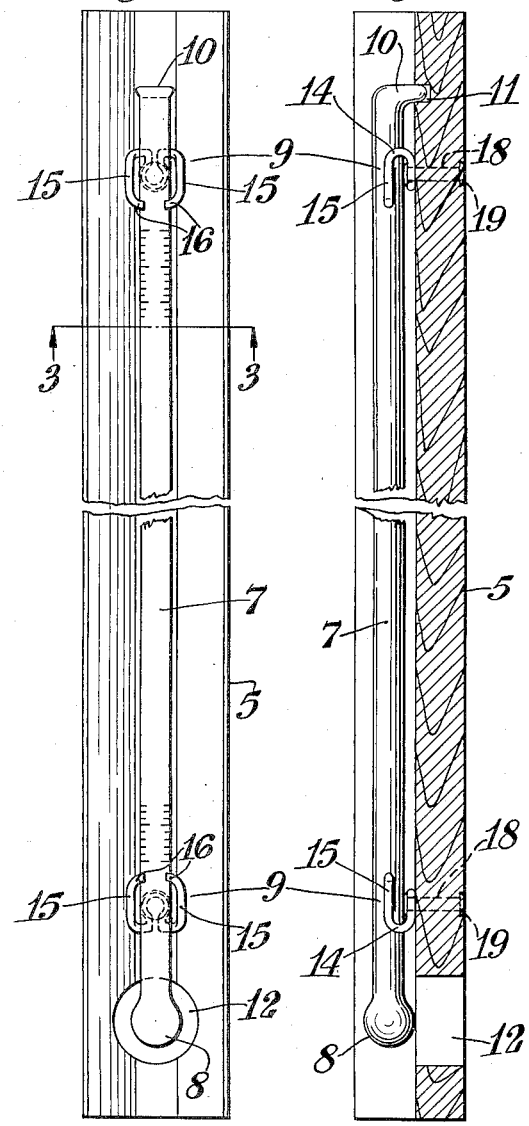
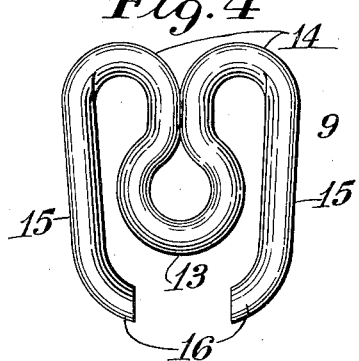
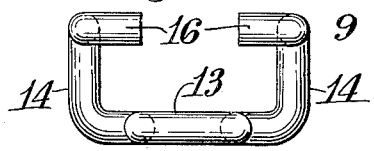
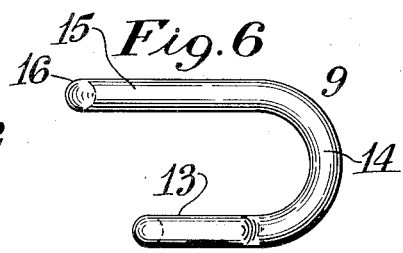
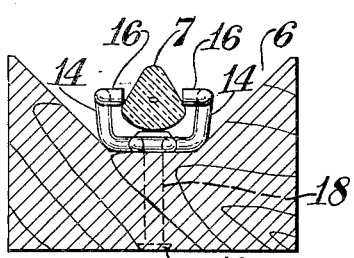
INVENTOR
HARRY D. BOLTON
BY D. Clyde Jones
ATTORNEY Patented Nov. 19, 1935

2,021,283

UNITED STATES PATENT OFFICE 2,021,283

THERMOMETER

Harry D. Bolton, Rochester, N. Y., assignor to Taylor Instrument Companies, Rochester, N. Y., a corporation of New York Application October 27, 1934, Serial No. 750,346

2 Claims. (Cl. 73—52)

This invention relates to thermometers and more particularly to means for detachably mounting a thermometer tube on a back or support.

Under certain conditions of use, it is desirable to mount a thermometer detachably on a support by means of clips. However, former clips for this purpose, soon lose their resilience under customary conditions of use so that they fail to retain the thermometer tube securely in place on the support.

The present invention has for its purpose the production of novel, reliable means for mounting a thermometer tube detachably on a support.

For an understanding of the invention, reference is made to the drawing in which Fig. 1 is a front elevation of a combined thermometer and support incorporating the present invention; Fig. 2 is a vertical section thereof taken along the channel of the support; Fig. 3 is a cross-section of the thermometer and support taken substantially on the line 3—3 of Fig. 1; and Figs. 4, 5 and 6 are respectively top, end and side views of a clip suitable for attaching a thermometer to a support.

In the drawing, 5 designates a thermometer support, preferably made of wood and having a trough or channel in its front. A thermometer tube 7 having graduations thereon and provided with a bulb 8 containing an expansive medium is supported by clips 9 adjacent the bottom of the channel so that the thermometer is protected against breakage. An integral hook 10 at the upper end of the thermometer tube engages a notch 11 in the support to prevent the tube from moving along the channel 6, whereas a hole 12 is provided in the support to receive the bulb 8 to afford further exposure therefor.

While clips have been employed in the past to mount a thermometer detachably on the support, former clips have been of such construction that they soon assume a permanent set even after a limited number of insertions in and removals of the thermometer from the support, with the result that they fail to grip the tube properly.

In accordance with the present invention, novel means for detachably fastening the thermometer tube on a support is provided. This fastening means includes the clips 9, each of which is preferably formed of a piece of somewhat resilient wire or like material, bent intermediate of its ends to form a loop and base 13. The portions of the wire are then curved away from the base as at 14 and thereafter are bent to provide the arms 15 spaced from but parallel to the base, while the ends 16 of these arms are curved inwardly. The ends 16 of each clip grip the thermometer tube therebetween as best illustrated in Fig. 3. The loop 13 of each clip is adapted to receive a hollow rivet 18 passing through the support and having its end 19 peened over. It will be noted that the construction of the clip is such that it affords relatively great effective length in small compass for the resilient tube engaging arms 15, and thereby largely obviates the tendency to set prevalent in prior fastening means utilized to removably supporting a thermometer tube.

What is claimed is,

1. In combination, a support, a thermometer tube, a pair of clips on said support detachably gripping said tube, each of said clips having a pair of tube gripping arms with the principal axes of said arms extending parallel to the main axis of said tube, said arms having inturned opposing ends to grip said tube.

2. In combination, a support, a thermometer tube detachably mounted on said support, and means including a clip detachably gripping said tube, said clip comprising a strip of material bent intermediate of its end portions to form a loop for engagement with said support and having end portions bent away from said loop and then parallel thereto, to provide tube gripping arms having their main axes extending generally parallel to the main axis of said tube.

HARRY D. BOLTON.